United States Patent [19]
Yamazaki et al.

[11] Patent Number: 5,890,989
[45] Date of Patent: Apr. 6, 1999

[54] DIFFERENTIAL APPARATUS FOR REDUCING FRICTION AND NOISE

[75] Inventors: Nobushi Yamazaki; Masao Teraoka, both of Tochigi, Japan

[73] Assignee: Tochigi Fuji Sangyo Kabushiki Kaisha, Tochigi-Ken, Japan

[21] Appl. No.: 844,038

[22] Filed: Apr. 18, 1997

[30] Foreign Application Priority Data

Apr. 19, 1996 [JP] Japan .................................. 8-098349
Jul. 23, 1996 [JP] Japan .................................. 8-193493

[51] Int. Cl.⁶ ............................. F16H 48/02; F16H 48/08
[52] U.S. Cl. ...................... 475/295; 475/230; 192/69.82; 180/247; 180/248
[58] Field of Search .................................. 475/295, 230, 475/302; 192/69.82, 69.83, 88 A, 54.3, 54.5; 180/247, 248, 249; 74/665 F, 665 GB, 665 T

[56] References Cited

U.S. PATENT DOCUMENTS

| | | | |
|---|---|---|---|
| 5,038,884 | 8/1991 | Hamada et al. ..................... | 180/248 X |
| 5,086,867 | 2/1992 | Hirota et al. ........................ | 180/248 X |
| 5,161,636 | 11/1992 | Haupt et al. ........................ | 475/230 X |
| 5,524,738 | 6/1996 | Erlebach et al. ..................... | 192/69.83 |
| 5,566,805 | 10/1996 | Sommer ............................. | 192/88 A X |

*Primary Examiner*—Charles A. Marmor
*Assistant Examiner*—Sherry Lynn Estremsky
*Attorney, Agent, or Firm*—Howard & Howard

[57] ABSTRACT

A differential apparatus for a part-time four-wheel drive vehicle is provided. The differential apparatus includes an outer differential casing, an inner differential casing, a clutch member adjacent to the inner differential casing, a pair of dog clutches, a differential gear system arranged in the inner differential casing and an actuator body for actuating the clutch member. One of the dog clutches is connected with the inner differential casing, while the other of the dog clutches is formed on the clutch member. When the vehicle is traveling under two-wheel drive, the inner differential casing and the differential gear system are raced, while the outer differential casing and the clutch member do not race. Accordingly, it is possible to reduce the racing loss of these members and the noise caused by the racing loss.

10 Claims, 10 Drawing Sheets

$\beta d - \alpha d > \beta c - \alpha c$

FIG. 10

$\alpha c = 0°$
$\alpha d = 0°$
$\beta c_1 = 0°$ $\beta d_1 - 0 > 0 - 0$
$\beta d_1 > 0$

FIG. 11

DIFFERENTIAL APPARATUS FOR REDUCING FRICTION AND NOISE

BACKGROUND OF THE INVENTION

The present invention relates to a differential apparatus to which driving force is to be cut off in a part-time four(4)-wheel drive car when in two(2)-wheel drive. More particularly, the invention relates to a differential apparatus having a mechanism for reducing frictional loss of the apparatus when not driven.

Figure 1:
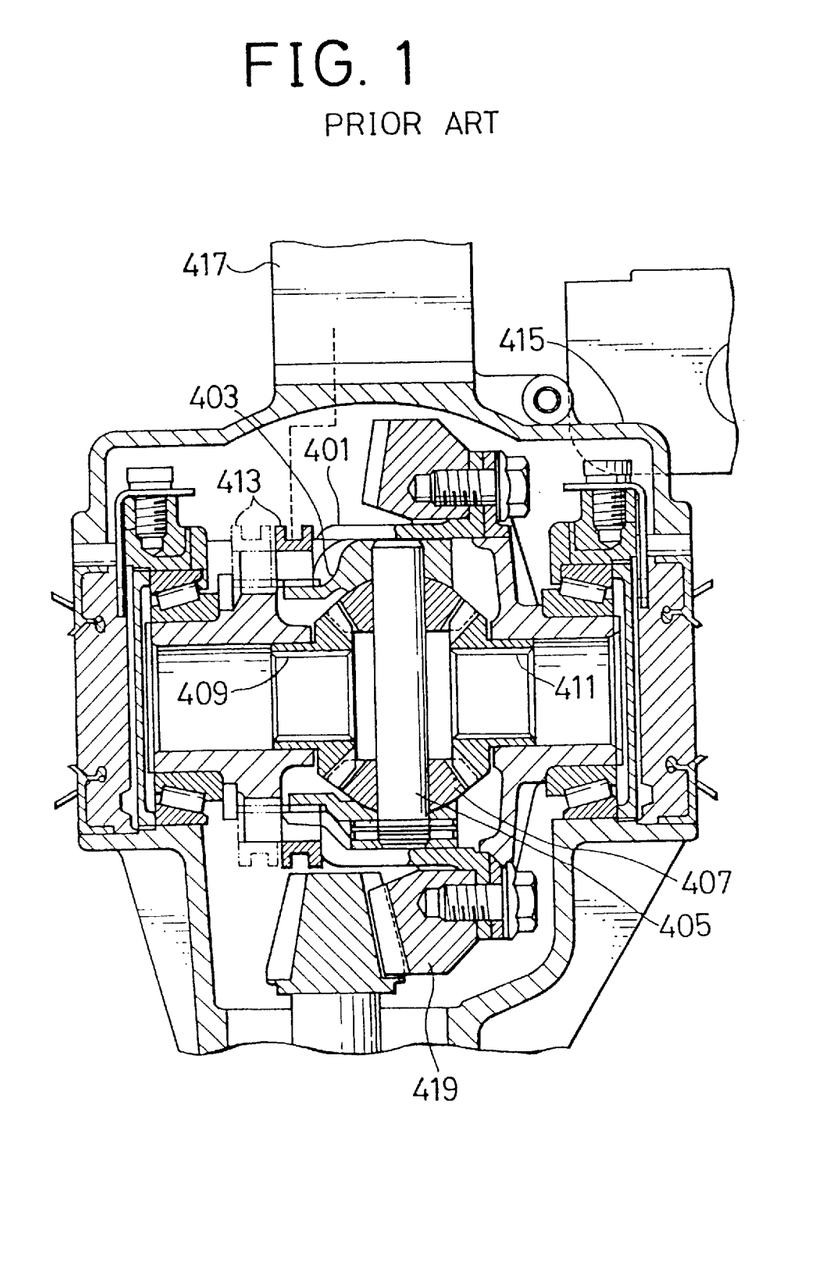
FIG. 1 is a cross-sectional view of a differential apparatus in the prior art.

In prior art part-time four-wheel drive cars of this kind, a differential apparatus such as shown in FIG. 1 is used. Such an apparatus is disclosed in Japanese Utility Model Publication (kokai) No. 63-193929.

In FIG. 1, assembled so as to rotate in a first casing 401 relatively is a second casing 403 in which a pinion shaft 405, a pinion gear 407 and left and right side gears 409, 411 etc. are arranged. A sleeve 413 is arranged so as to slip on the outer periphery of the first casing 401. With the slipping movement of the sleeve 413, both casings 401, 403 can be either operatively associated with, or separated from, each other.

When it is desired to switch from four-wheel drive into two-wheel drive, due to a driver's manipulation of a controller in a vehicle cabin, the sleeve 413 is shifted to the left side of FIG. 1 by a switching unit 417 provided on a differential carrier 415. Consequently, the association between the first casing 401 and the second casing 403 is released, so that the casings can rotate relatively to each other.

In this way, while the second casing 403, the pinion shaft 405, the pinion gear 407 and the left and right side gears 409, 411 etc. race independent of tire rotation due to the vehicle's traveling, the surrounding first casing 401 and a ring gear 419 etc. do not race since the power transmission is cut off by switching of a transfer unit. Thus, racing loss and occurrence of noise can be reduced.

In the above-mentioned differential apparatus, however, since the switching unit 417 for switching between 4-wheel/2-wheel driving operation is disposed outside the differential carrier 415, it has been unavoidable that the differential carrier 415 is subjected to detailed remodeling to install a mechanism for sliding the sleeve 413 in the carrier 415.

Furthermore, the known art has to ensure a space allowing the axial sliding of the sleeve 413 in the first casing 401. For this reason, the first casing 401 is apt to have a one-sided weight imbalance and deviated configuration. Thus, an ill balanced configuration is caused in the differential apparatus.

SUMMARY OF THE INVENTION

It is therefore an object of the present invention to provide a differential apparatus which includes a compact mechanism for preventing a racing caused at the time of switching for the two-wheels driving and which keeps alteration of the differential carrier to be a minor change.

The object of the present invention described above can be accomplished by a differential apparatus for a part-time four-wheel drive vehicle, which is rotatably accommodated in a differential carrier arranged on the side of axles from which a driving force of an engine is cut off when switching from the four-wheel drive into two-wheel drive. The inventive apparatus is capable of distributing the driving force into left and right axles of the vehicle under the four-wheel drive conditions. The differential apparatus comprises: an outer differential casing rotated by the driving force of the engine. An inner differential casing is accommodated in the outer differential casing so as to coaxially rotate therein. The inner differential casing is shaped to be a substantial cylinder. A clutch member is accommodated in the outer differential casing adjacent to the inner differential casing and to move in the axial direction with respect to the outer differential casing. The clutch member is shaped to be a substantial cylinder and is associated with the outer differential casing so as to rotate integrally therewith. A pair of dog clutches is accommodated in the outer differential casing to be engageable with and disengageable from each other. One of the dog clutches is arranged on an axial end face of the inner differential casing, which faces the clutch member. The other dog clutch is arranged on an axial end face of the clutch member, which faces the inner differential casing. A differential gear system is arranged in the inner differential casing, and in the form of bevel gears. An actuator is provided for actuating the clutch member so that the dog clutches are engaged with or disengaged from each other in association with the vehicle's switching operation between the four-wheel drive and the two-wheel drive. The actuator is mounted on the differential carrier so as to be adjacent to the clutch member.

Therefore, when the vehicle is traveling under the two-wheel drive condition, the inner differential casing and the differential gear system etc. are raced through a driving path opposite to the driving path driving four-wheel drive. However, the outer differential casing and the clutch member etc. do not race. Accordingly, it is possible to reduce the racing loss of these members and the noise caused by the racing loss. Further, since the actuator can be arranged in the differential carrier, it is possible to provide a compact mechanism for preventing racing during two-wheel drive with a minor modification of the differential carrier.

In the present invention, preferably, the differential gear system comprises a pinion shaft secured on the inner differential casing perpendicularly to an axis thereof. A plurality of pinion gears is carried by the pinion shaft to rotate thereon. A pair of side gears is connected with the left and right axles respectively. The side gears mesh with each other and having respective boss portions born by the outer differential casing. The outer differential casing has a inner wall portion for receiving a thrust force of the inner differential casing, which originates in the engagement of the dog clutches and another inner wall portion for receiving a thrust force of the side gears.

In this case, owing to the arrangement where the inner differential casing accommodating the differential gear system has a side face opposite to the clutch member, which is axially supported by the inner wall portion of the outer differential casing, the differential apparatus can be formed to be compact in the axial direction. Further, since the thrust forces of the actuator means and the dog clutches are received by the outer differential casing through the inner differential casing, the arrangement does not exert a bad influence on meshing gears of the pinion gears and side gears.

More preferably, the dog clutches, the actuator means for engaging or disengaging the dog clutches and the wall portion for receiving the thrust force of the inner differential casing are arranged substantially on the same diameter.

Since the power transmission among the respective elements is preferably carried out on the same diameter and power is not transmitted among portions of different diameters, it is possible not only to ensure the strength of the above elements but to smoothly accomplish the engagement/disengagement of the dog clutches.

Further, it is preferable that an outer wall portion of the outer differential casing is provided with a plurality of holes arranged in the circumferential direction. The clutch member is preferably provided with a plurality of legs which are engaged into the holes, respectively, so that the clutch member is associated with the outer differential casing so as to rotate integrally therewith. Similarly, it is preferable that each of the holes are defined by opposing side faces which are convergent-tapered toward the outside in the axial direction of the differential apparatus. Each of the legs are also defined by opposing side faces which are convergent tapered toward the outside in the axial direction of the differential apparatus. Thus, cams are provided by the opposing side faces of the holes and the legs and the dog clutches are urged to engage each other at the outer differential casing's rotating.

In this case, it is possible to decrease the axial movements of the clutch member and ensure engagement of the dog clutches.

In the present invention, preferably, the actuator comprises a return spring for urging the clutch member in a direction to disengage the dog clutches from each other. An actuator body is provided for operatively moving the clutch member to the opposite direction to engage the dog clutches with each other, opposing to the urging force of the return spring.

More preferably, the dog clutches include meshing teeth profiled with cam angles α by which the clutch member is urged to the direction to disengage the dog clutches from each other. The cams are profiled with cam angles β by which the clutch member is urged to the direction to engage the dog clutches with each other. The cam angles of the dog clutches and the cam angles of the cams in the vehicle's forward traveling are represented by αd, βd, respectively, while the cam angles of the dog clutches and the cam angles of the cams in the vehicle's backward traveling are represented by αc, βc, respectively. A relationship among the cam angles is established as follows:

$$\beta d - \alpha d > \beta c - \alpha c$$

With the above establishment, during the vehicle's traveling, the force of inertia in the rotating direction is applied on the clutch member. Then, in the dog clutches, the portion having the cam angle of βd simultaneously cooperates with the portion having the cam angle of αd. Meanwhile the portion having the cam angle of βc simultaneously cooperates with the portion having the cam angle of αc. Since the cam angle βd is set to be larger than the cam angle αd, the difference (βd−αd) corresponds to the thrust force to engage the dog clutches with each other.

Further, since the thrust force (βd−αd) in the direction of engagement is larger than the thrust force (βc−αc) in the direction of disengagement, the former thrust force is exerted on the clutch member during the vehicle's traveling. Therefore, the dog clutches can be prevented from being disengaged from each other to maintain the 4-wheel drive condition on the vehicle. When it is required to switch into 2-wheel drive, the switching operation can be accomplished, because the thrust force is decreased.

In this way, since it is possible not only to maintain 4-wheel drive but to facilitate switching to 2-wheel drive, there is no need to enlarge the return spring and the actuator body. This is contrary to the conventional differential apparatus. This not only provides reduced cost in manufacturing, but the frictional wear of respective slipping elements can be reduced.

Further, since the disengagement of the dog clutches is facilitated at the vehicle's backward traveling, it is also possible to facilitate the disengagement of the dog clutches by traveling the vehicle backward.

In addition to the above establishment, more preferably, the cam angles are further characterized by equations as follows:

$$\alpha c = 0°$$

$$\alpha d = 0°$$

$$\beta c = 0°$$

In this case, with the fixing of the cam angles αd, αc of 0°, any thrust force to disengage the dog clutches from each other is not produced even if inertia in the rotating direction is applied on the clutch member. Consequently, the engagement of the dog clutches can be maintained stably.

Furthermore, owing to the cam angle αd of 0°, the opposite cam angle βd can be decreased as much. Similarly, owing to the cam angle αc of 0°, it is possible to set the opposite cam angle βc of 0°.

In this way, owing to the reduction in cam angles and the resulting decreased thrust forces, it is possible to decrease the spring constant of the return spring and correspondingly, the actuator body can be made small.

Alternatively, it is also preferable that the cam angles are further characterized by equations as follows:

$$\alpha c = 0°$$

$$\alpha d = 0°$$

$$\beta d > \beta c$$

In this case, with the relationship of βd>βc, the engagement in the dog clutches can be maintained at the vehicle's forward driving, while the disengagement of the dog clutches can be facilitated at the vehicle's backward traveling. Of course, with the fixing of the cam angles αd, αc of 0°, even if the inertia in the rotating direction is applied on the clutch member, the engagement of the dog clutches can be maintained stably.

Also in this case, owing to the cam angle αd of 0°, the opposite cam angle βd can be decreased as much. Similarly, owing to the cam angle αc of 0°, the disengagement function against the dog clutches by the cam angle βc is progressed. Additionally, owing to the reduction in cam angles and the resulting decreased thrust forces, it is possible to decrease the spring constant of the return spring and correspondingly, the actuator body can be made smaller.

In the present invention, preferably, the actuator body is annular shaped and is arranged about a boss portion of the outer differential casing and adjacent to the outer wall portion of the outer differential casing, coaxially with the boss portion.

In this case, with the arrangement of the actuator body, the differential apparatus can be made smaller and simplified. Additionally, the arrangement allows the clutch member to be urged uniformly in the circumferential direction, whereby the operation of the actuator means can be improved.

More preferably, the actuator body includes a diaphragm which is displaced by air pressure and a stopper for limiting the displacements of the diaphragm.

In this case, owing to the provision of the stopper, it is possible to remain a clearance between the actuator body and the outer differential casing even when the dog clutches are engaged with each other. Therefore, it is possible to exclude the problem of wearing in the actuator body and the outer differential casing.

In the present invention, it is preferable that the differential apparatus further comprises a retainer for retaining the clutch member. The retainer is preferably in the form of a thin cylindrical member and consists of a flange formed at one axial end of the cylindrical member to extend perpendicular to the axis of the cylindrical member for bearing one end coil of the return spring on the side of the clutch member. A flared portion is formed at the other axial end of the cylindrical member so as to project radially outward and engage in a peripheral groove formed on the inner periphery of the clutch member.

In this case, the retainer constructed as above allows the return spring to be attached the clutch member with ease, so that the workability in assembling the differential apparatus can be improved.

These and other objects and features of the present invention will become more fully apparent from the following description and appended claims taken in conjunction with the accompanying drawings.

DESCRIPTION OF THE PREFERRED EMBODIMENT

A variety of embodiments in accordance with the present invention are now described with reference to the drawings.

The First Embodiment

Figure 2:
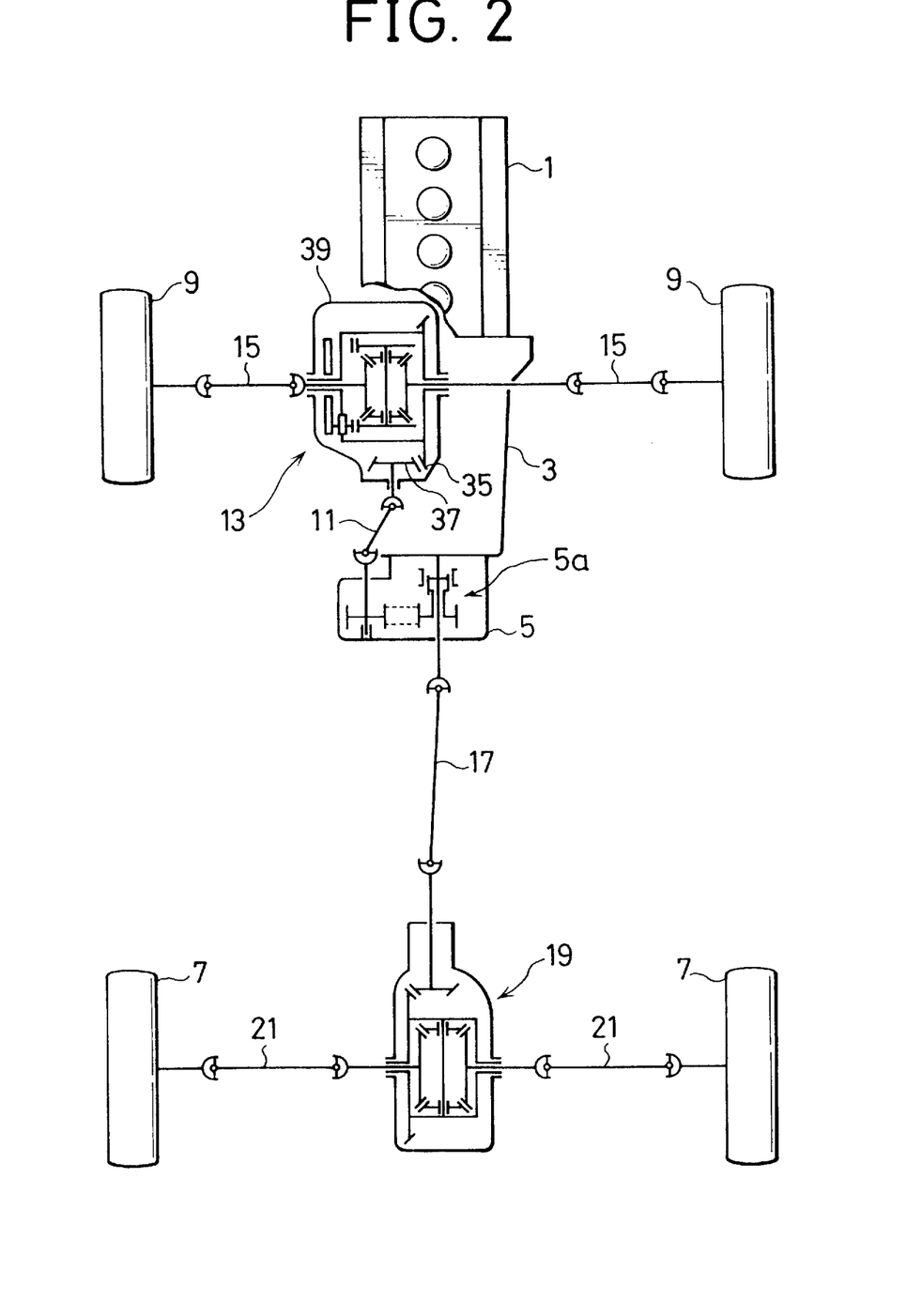
FIG. 2 is a schematic view showing a power transmission system including a differential apparatus in accordance with a first embodiment of the present invention.
Figure 3:
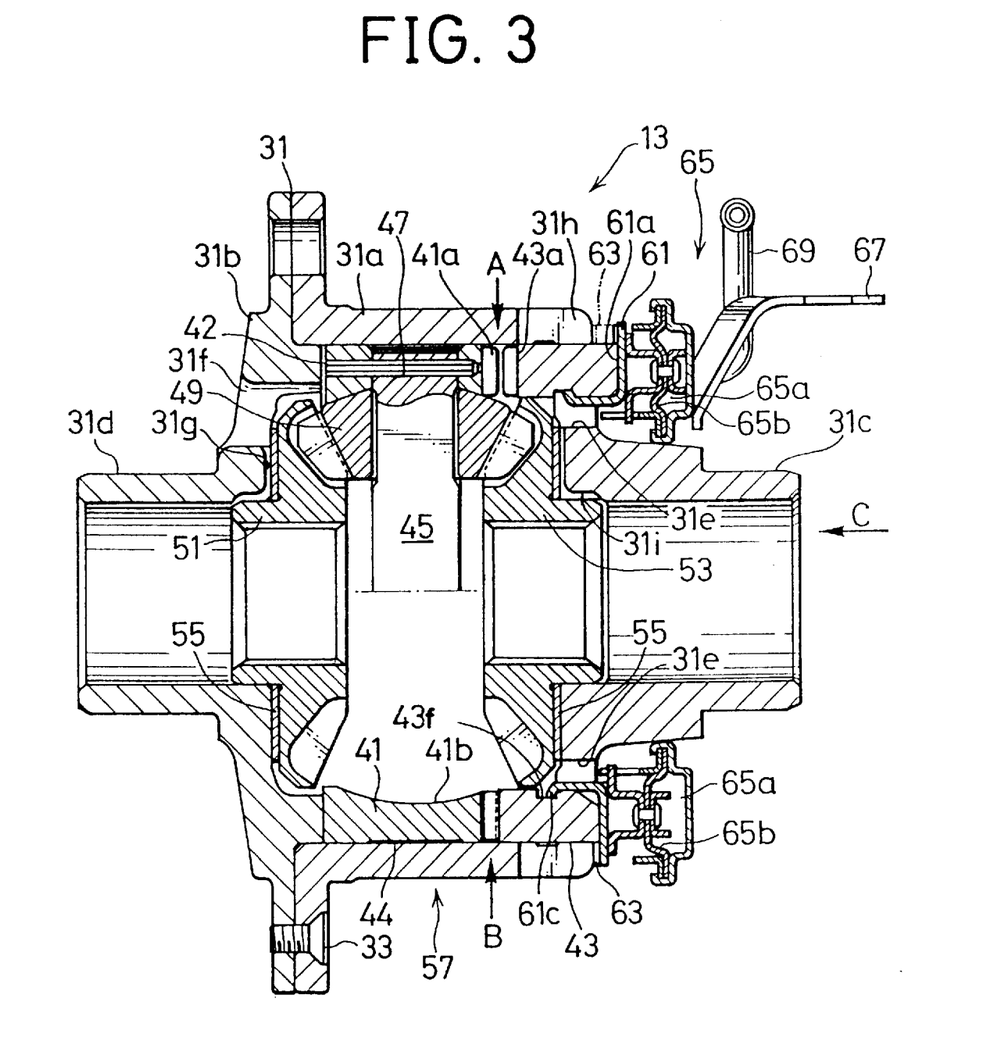
FIG. 3 is a cross sectional view of the differential apparatus of the first embodiment.

The first embodiment of the invention is shown in FIGS. 2 to 6. FIG. 2 shows a power transmission system of a part-time 4-wheel drive car, which is constructed on a basis of a rear drive car. The differential apparatus of the embodiment is applied for a front differential apparatus of the vehicle. FIG. 3 is the whole cross sectional view of the front differential apparatus of the embodiment.

As shown in FIG. 2, the driving force of an engine 1 is distributed into rear wheels 7 and front wheels 9 through a transmission 3 and a transfer case 5. The driving force for the front wheels 9 is transmitted to the front differential apparatus 13 of the embodiment through a propeller shaft 11 and then distributed into left and right front axles 15, 15 to drive the front wheels 9, 9. The driving force for the rear wheels 7 is inputted to a rear differential apparatus 19 through a propeller shaft 17 and then distributed into left and right rear axles 21, 21 to drive the rear wheels 7, 7.

As shown in FIG. 3, the front differential apparatus 13 includes an outer differential casing 31 consisting of a casing body 31a and a cover 31b fixed to the body 31a through bolts 33. Fixed on the differential casing 31 is a ring gear 35 (FIG. 2) into which the driving force of the engine 1 is inputted through a pinion gear 37 (FIG. 2).

Boss portions 31c, 31d on both ends of the outer differential casing 31, carry a differential carrier 39 (FIG. 2) so as to rotate therein. The differential carrier 39 is provided with an oil reservoir. Further, oil grooves 31g, 31i are formed to communicate with the inner peripheries of the boss portions 31c, 31d, respectively. In operation, lubricating oil in the oil reservoir of the differential carrier 39 flows into and out of the inside of the casing body 31a through openings 31h (four openings) of the casing body 31a and openings 31f (four openings in the circumferential direction) of the cover 31b.

Figure 4A:
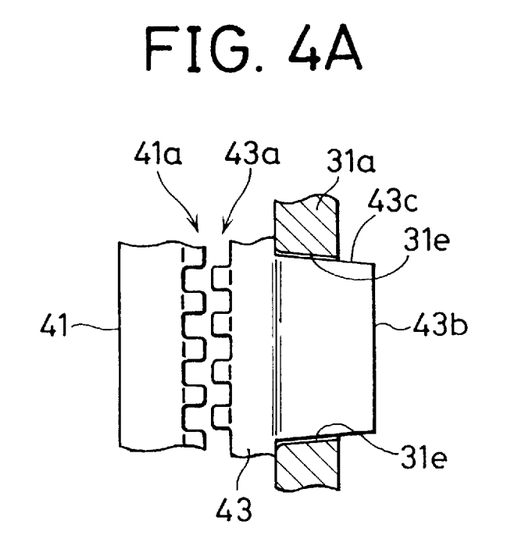
FIG. 4A is a partial schematic view of dog clutches in FIG. 3, viewed in the direction of arrow A therein.

In the casing body 31a, an inner differential casing 41 in the form of a substantially short cylinder is fitted so as to rotate coaxially. The inner differential casing 41 is provided, on the outer periphery, with a peripheral groove 44 of a predetermined width and is supported, on both sides of the groove 44, by the casing body 31a. On the right hand neighbor of the inner differential casing 41, a clutch member 43 in the form of a substantially short cylinder is accommodated in the casing body 31a, too. As shown in FIGS. 3 and 4A, the inner differential casing 41 is provided, on the surface opposing the clutch member 43, with a radial dog clutch 41a. Similarly, the clutch member 43 is also provided, on the surface opposing the inner differential casing 41, with a radial dog clutch 43a which is engageable and disengageable with the dog clutch 41a. Respective meshing teeth of the dog clutches 41a, 43a are tapered off to provide the proper meshing condition. Further, the inner differential casing 41 is provided, on the opposite surface to the meshing teeth, with six oil grooves 42 in the radial direction, which are adjacent to the outer differential casing 31.

Figure 4B:
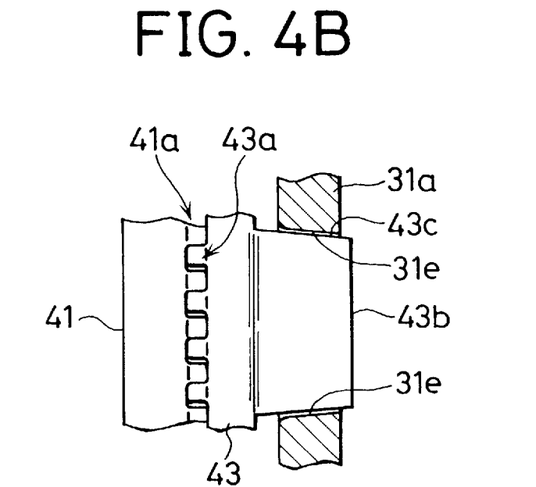
FIG. 4B is a partial schematic view of the dog clutches in FIG. 3, viewed in the direction of arrow B therein.

FIG. 3 (an upper half portion in the figure) and FIG. 4A show a disengaged condition with the dog clutches 41a, 43a separated from each other, and corresponding to 2-wheel drive condition of the vehicle. On the other hand, FIG. 3 (a lower half portion in the figure) and FIG. 4B show 4-wheel drive condition with dog clutches 41a engages dog clutch 43a.

Perpendicularly to a rotational axis of the inner differential casing 41, a pinion shaft 45 is fixed on the casing 41 through a spring pin 47. On the pinion shaft 45, a pair of pinion gears 49 are rotatably mounted to mesh with a pair of opposing side gears 51, 53. An inner face 41b of the inner differential casing 41 receives the thrust force of the pinion gears 49. A pair of washers 55, 55 are arranged between the side gears 51, 53 and the outer differential casing 31 to receive the thrust force of the side gears 51, 53, respectively. Being respectively provided with boss portions which are born by the outer differential casing 31, the side gears 51, 53 are spline-connected with the front axles 15, 15 of FIG. 2, respectively. In this way, a differential gear mechanism 57, which consists of the inner differential casing 41, the pinion gears 49 and the side gears 51, 53, is not directly associated with the outer differential casing 31. Note, the side gears 51, 53 are forged gears of identical configurations. Each side gear 51, 53 is provided, on its outer periphery, with a thickened padding in the form of a circumferential rib for ensuring strength in meshing with the pinion gears 49.

Figure 5A:
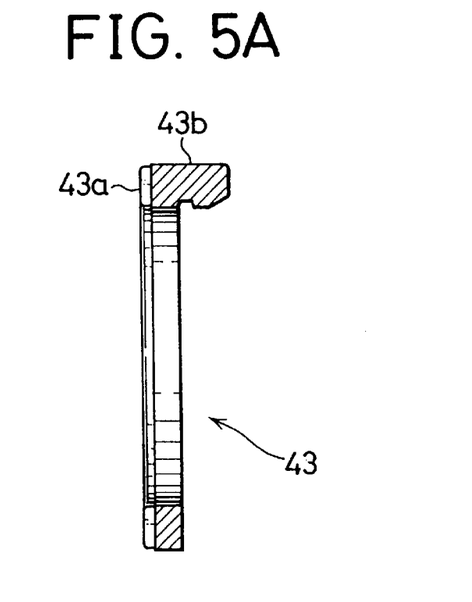
FIG. 5A is a cross sectional view of a clutch member constituting the differential apparatus of the first embodiment, taken along a line 5A—5A of FIG. 5B.
Figure 5B:
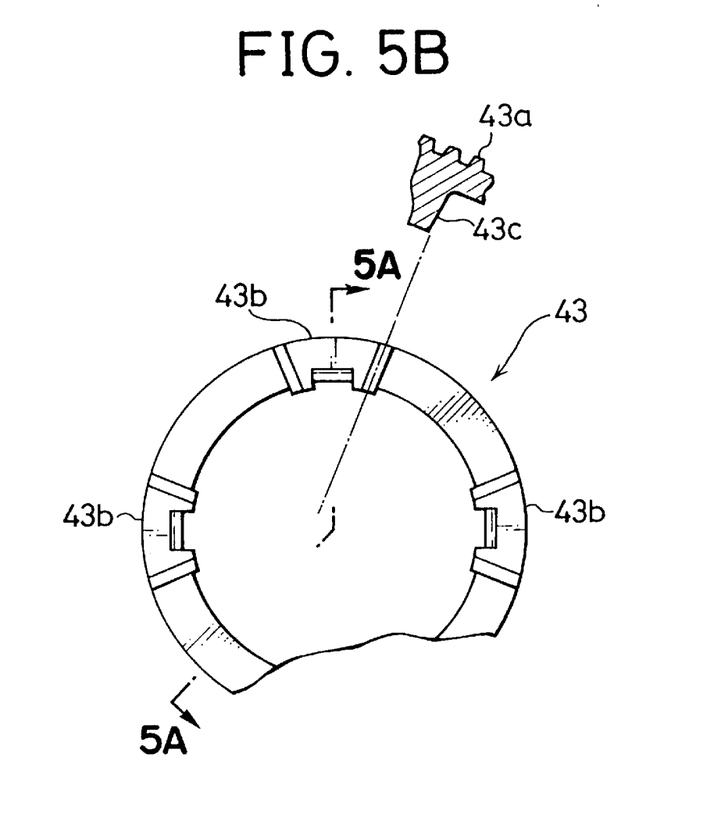
FIG. 5B is a partial plan view of the clutch member of FIG. 5A, viewed in the direction of arrow C in FIG. 3.

As shown in FIGS. 5A and 5B, the clutch member 43 has four fan shaped legs 43b formed to project on the end face opposite to the dog clutch 43a and spaced equally in the circumferential direction. Further, as shown in FIGS. 4A, 4B and 5A, both of circumferential end faces 43c of each fan-shaped leg 43b are tapered toward the outside (i.e. the right hand in the figures) at a predetermined angle with the axial direction.

Figure 6A:
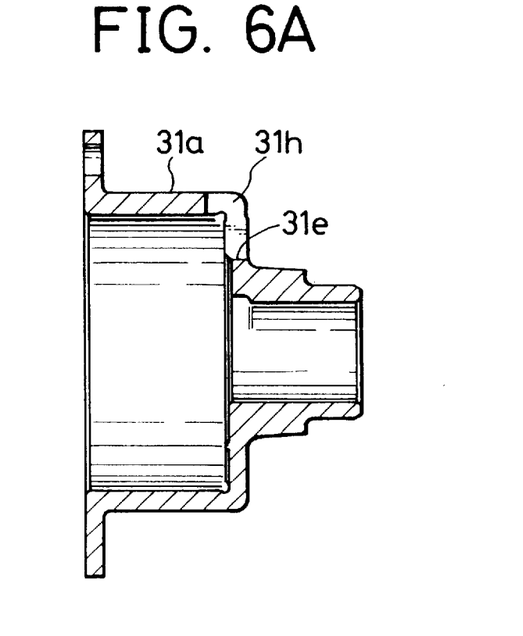
FIG. 6A is a cross sectional view of a casing body constituting the differential apparatus of the first embodiment, taken along a line 6A—6A of FIG. 6B.
Figure 6B:
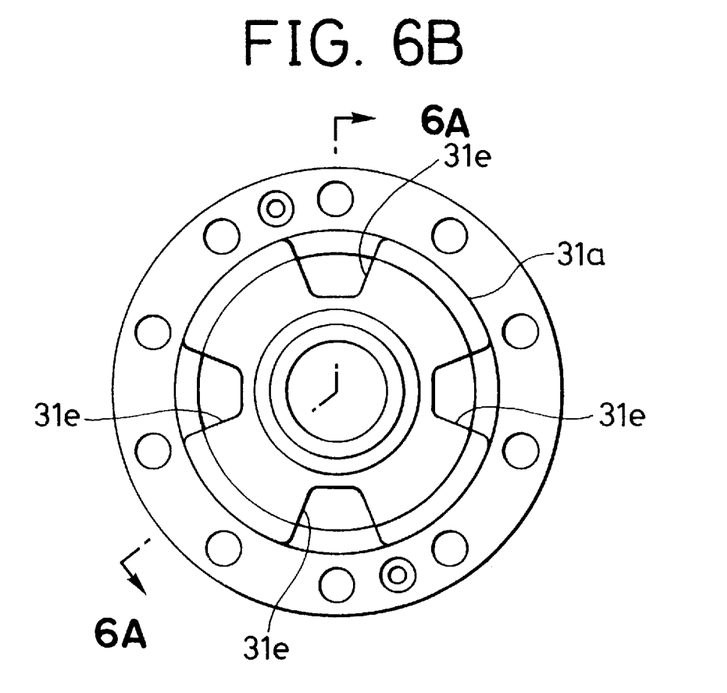
FIG. 6B is a plan view of the clutch member of FIG. 5A, viewed in the direction of arrow C in FIG. 3.

As shown in FIGS. 6A and 6B, the outer differential casing 31 is provided, on the right end wall (FIG. 6A) of the casing body 31a, with four fan-shaped holes 31e which are arranged equally in the circumferential direction and positioned in correspondence with the above-mentioned legs 43b, respectively. With the arrangement, the legs 43b are engaged into the holes 31e, so that the clutch member 43 always rotates together with the outer differential casing 31 while the end faces 43c of each leg 43b come in contact with the margins of the fan-shaped hole 31e. The margins of the fan-shaped holes 31e are also tapered in parallel with the end faces 43c of the legs 43, as shown in FIGS. 4A and 4B.

Therefore, when the outer differential casing 31 drives to rotate the clutch member 43, it is urged toward the inner differential casing 41 (the left hand of FIG. 3) due to the inclination of the end faces 43c of the legs 43b. Thus, the dog clutches 41a, 43a becomes easy to engage with each other. Note, the inclination of the end faces 43c is established to be larger than that of the tapered meshing portions of the dog clutches 41a, 43a. In this way, the clutch member 43 is engaged so as to axially move in the outer differential casing 31.

At the right-hand neighbor of the clutch member 43 of FIG. 3, a diaphragm actuator body 65 is arranged to constitute one member of actuator means. The actuator body 65 is fixed on the differential carrier 39 (FIG. 2) through a bracket 67. The actuator body 65 includes a pressure chamber 65a communicating with a pressure source (not-shown) on the outside through a flow path 69. Further, a return spring 63 constituting the other member of the above actuator means passage is disposed between the casing body 31 and the clutch member 43.

On the tops of legs 43b of the clutch member 43, a retainer 61 composed of a spring member in the form of a thin cylinder is attached to the clutch member 43. The retainer 61 has a flange 61a formed on the side of the tops of the legs 43b. Thus, in detail, the return spring 63 is disposed between the flange 61a and the casing body 31a.

The retainer 61 is partially confined and urged against the inner periphery of the clutch member 43 through a flared portion 61c which projects radially outwardly of the member 43 and engages groove 43f. In this way, since the clutch member 43 is integrated with the retainer 61, the return spring 63 operates to urge the retainer 61 in a manner that the clutch member 43 is separated from the casing body 31a axially outward (to the right hand in FIG. 3).

According to the embodiment, owing to the above-mentioned substantially co-diametrical arrangements of the dog clutches 41a, 43a; the engagement portions of the clutch member 43 with the holes 31e of the outer differential casing 31; the actuator body 65; the return spring 63 and the bearing portion of the inner differential casing 41 on the opposite side of the dog clutch 43a, the force transmission at the dog clutches' 41a, 43a engagement or disengagement is performed on the substantial same diameter naturally, so that the engagement/disengagement can be carried out smoothly.

The front differential apparatus 13 operates as follows.

Providing that a designated pressure is applied into the pressure chamber 65a of the actuator body 65 (4-wheel drive), a diaphragm 65b is displaced to the left hand (FIG. 3) in opposition to the urging force of the return spring 63. In this state, since the dog clutch 41a of the inner differential casing 41 engages the other dog clutch 43a of the clutch member 43, the outer differential casing 31 rotates together with the inner differential casing 41 in one body. Then, the thrust force of the inner differential casing 41 at the engagement of the dog clutches 41a, 43a is received by the wall of the outer differential casing 31.

On the other hand, when the pressure in the chamber 65a is released, the diaphragm 65b is returned to the right hand (FIG. 3) by the urging of the return spring 63. In this state, since the dog clutch 41a of the inner differential casing 41 disengages from the other dog clutch 43a of the clutch member 43, the outer differential casing 31 can rotate independent of the inner differential casing 41 (2-wheels driving condition). It is noted that the exerting and releasing of pressure in the pressure chamber 65a executed in association with the operation of a 4-wheel drive/2-wheel drive switching unit 5a of the transfer case 5 (FIG. 2).

In the vehicle shown in the figure, when 4-wheel drive/2-wheel drive switching unit 5a operates to switch the driving condition of the vehicle from 4-wheel drive to 2-wheel drive, the driving force of the engine 1 to the front wheels 9 is cut off at this unit 5a. Consequently, the driving force of the engine 1 is transmitted to the rear wheels 7, 7 only, through the rear differential apparatus 19 and the propeller shaft 17.

Thereafter, as long as the vehicle travels under 2-wheel drive, the differential gear mechanism 57 is raced by the front wheels 9 through a driving path opposite to the driving path at the 4-wheels driving. On the contrary, the clutch member 43, the outer differential casing 31 and the ring gear 35 etc. do not race since the pressure in the pressure chamber 65a of the actuator body 65 is released in association with the switching for 2-wheel drive. Accordingly, with the operation of the mechanism 57, it is possible to reduce the racing loss of these members and the resulting noise.

As to the lubrication, the lubricating oil in the differential carrier 39 flows into the outer differential casing 31 through the inner peripheries of the boss portions 31c, 31d and lubricates the washers 55, 55 through the oil grooves 31g, 31i. While, the lubricating oil which has flowed in the casing 31 through the opening 31f in the cover 31b lubricates the abutting side faces and the circumferential bearing faces of the inner and outer differential casings 41, 31.

In this way, according to the embodiment, since actuator body 65 can be arranged in the differential carrier 39 while the communication with the outside of the differential carrier 39 is attained by the only flow path 69 between the pressure chamber 65a and the outside pressure source, it is possible to disengage the dog clutches 41a, 43a at the inactive time of the front differential apparatus 13 (i.e. the 2-wheel drive condition) without greatly enlarging the differential carrier 39.

Further, when the opposite side face to the dog clutch 41a of the inner differential casing 41 is axially born by the wall of the outer differential casing 31, it is possible to form the front differential apparatus 13 to be axially compact.

In addition, since dog clutches 41a, 43a, actuator body 65, return spring 63 and the wall portions of the outer differential casing 31, which bears the thrust force of the inner differential casing 41, are arranged on substantially the same diameter, force transmission among the respective elements is along the substantial same diameter without force transmission at different diametrical portions. Therefore, it is not only possible to ensure the strength of the respective elements sufficiently but the engagement/disengagement of the clutch can be carried out smoothly.

Again, it is noted that the connection between the outer differential casing 31 and the clutch member 43 for rotation is carried out by the respective engagements of legs 43b of the clutch member 43 into holes 31e of outer differential casing 31, and contact faces of holes 31e and legs 43b being inclined in the axial direction. For these reasons, the engagement of the dog clutches 41a, 43a can be strengthened. Furthermore, as input torque into the outer differential casing 31 becomes larger, the engagement between dog clutches 41a and 43a is strengthened, any problem with strength shortage at locational areas of the clutches 41a, 43a is reduced.

Further, since the diaphragm actuator body 65 and the return spring 63 are used as the actuator means for actuating the dog clutches 41a, 43a, the engagement/disengagement manipulation can be executed with ease.

Additionally, according to the embodiment, retainer 61 is composed of the flange 61a extending perpendicularly to the axis and the flared portion 61c projecting radially outward and integrated with the clutch member 43 by the engagement of the portion 61c in the groove 43f of the clutch member 43. The flange 61a also bears one end coil of return spring 63. Consequently and mounting of the return spring 63 on the clutch member 43 can be facilitated to improve the workability in assembling the front differential apparatus.

Further, owing to the provision of oil grooves 31g, 31i, 42 etc., the sufficient lubrication is provided. Since the inner differential casing 41 is born by the outer differential casing 31 on both sides of the peripheral groove 44, the bearing capability against the casing 41 can be improved to reduce frictional resistance. That is, with the supporting form mentioned above, it is not only possible to reduce the rotational loss of the differential apparatus 13 but to prevent the occurrence of seizure.

The Second Embodiment

Figure 7:
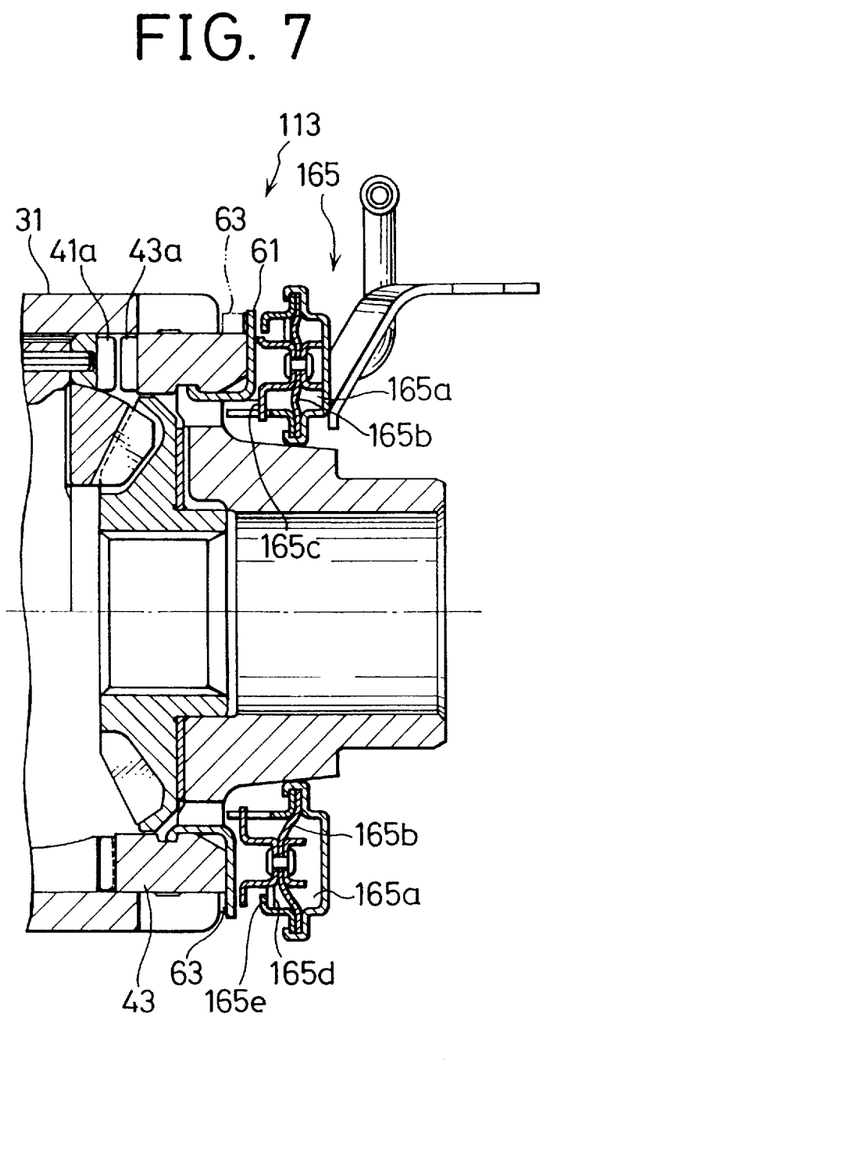
FIG. 7 is a cross sectional view of an essential part of a differential apparatus of a second embodiment.

The second embodiment of the invention will be described with reference to FIGS. 7 and 8. FIG. 7 shows an essential part of the differential apparatus of the embodiment.

The second embodiment is also for the part-time 4-wheel drive car, which is constructed on a basis of the rear drive car. Further, the differential apparatus of the embodiment is applied for a front differential apparatus of the vehicle.

This embodiment does not differentiate the front differential apparatus 113 from that of the first embodiment except with regard to actuator body 165 (actuator means) at the time of switching for 2-wheel drive condition. Therefore, we now describe the differences between the first embodiment and the second embodiment and the overlapping descriptions therebetween will be eliminated.

Figure 8:
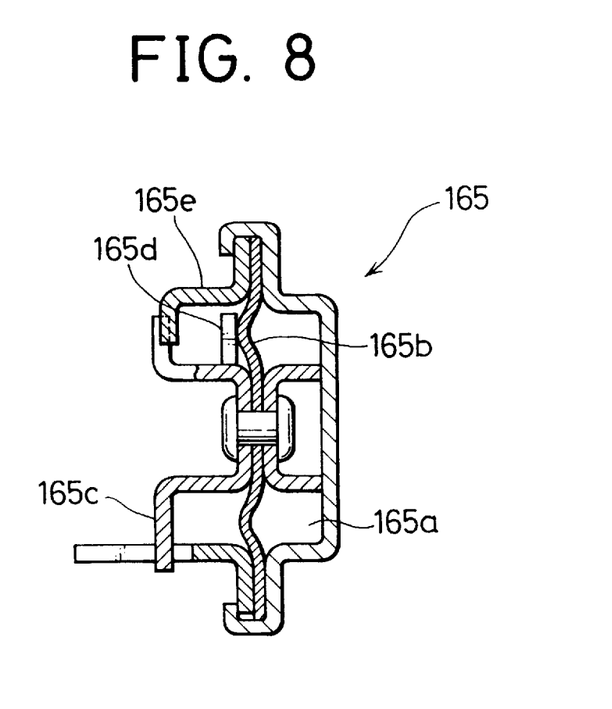
FIG. 8 is a cross sectional view of an actuator of the differential apparatus of the second embodiment.

As shown in FIG. 8, the actuator body 165 comprises a pusher 165c secured on a diaphragm 165b through rivets, and a stopper 165d fixed on the pusher 165c. Thus, stopper 165d is adapted to move together with diaphragm 165d.

In operation, when applying pressure into pressure chamber 165a, the stopper 165a displaces to the left hand of FIG. 7 together with the diaphragm 165b. The movement of the actuator body 165 is limited by the abutment of the stopper 165d on a frame 165e of the actuator body 165 (see the lower half portion of FIG. 7). At this time, the vehicle is brought into 4-wheel drive with dog clutch 41a engaged with dog clutch 43a. Thus, the retainer 61 on the side of the clutch member 43 rotates, while the actuator body 165 is inactivated. If the actuator body 165 is mounted on the differential carrier 39 so that a clearance of a predetermined width can be ensured between the pusher 165c and the retainer 61 by means of the stopper 165, it will be possible to avoid friction between pusher 165c and retainer 61.

Note, the upper half portion of FIG. 7 shows a condition that the pressure in the pressure chamber 165a of the actuator body 165 has been released, so that the diaphragm 165b and the pusher 165c are returned to the right by the urging force of the return spring 63. The dog clutches 41a, 43a are disengaged from each other. Although the front differential apparatus 113 does not operate to transmit the power on 2-wheel drive condition at that time, no frictional movement is caused similarly to the above case since the outer differential casing 31, the clutch member 43 (the retainer 61) and the actuator body 165 have been suspended.

According to the embodiment, in addition to the effects of the first embodiment, it is possible to separate the actuator body 165, which moves the clutch member 43 on the stator's side, from the clutch member 43 during the engaging of the dog clutches 41a, 43a, so that wear can be eliminated.

The Third Embodiment

Figure 9:
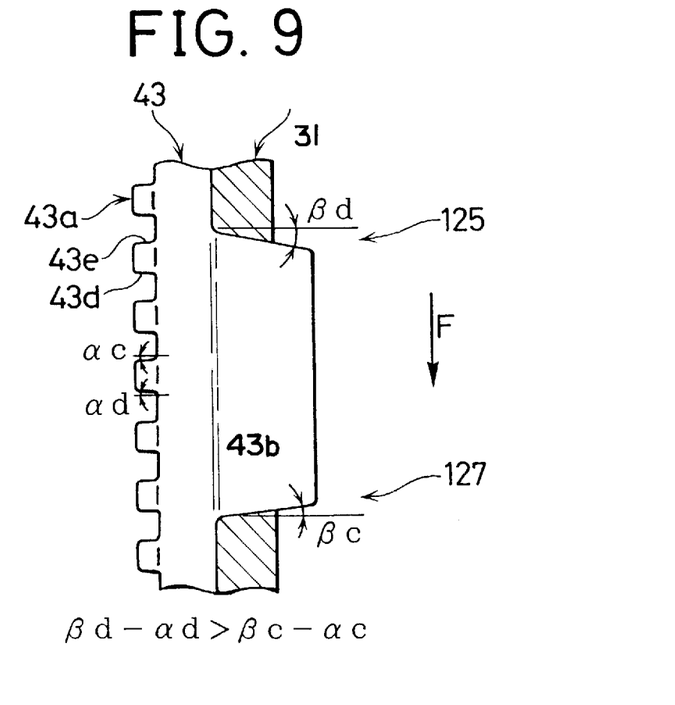
FIG. 9 is a partial schematic view of a dog clutch of a differential apparatus in accordance with a third embodiment of the present invention, similarly to FIG. 4A viewed in the direction of arrow A of FIG. 3.

The third embodiment of the invention will be described hereinafter, with reference to FIG. 9 showing an essential part of the dog clutch 43a of the embodiment. Note, an arrow F of FIG. 9 designates a rotational direction of the outer differential casing 31 in case of the vehicle's forward traveling.

The rotation of the outer differential casing 31 during the vehicle's forward traveling is transmitted to the inner differential casing 41 (FIG. 3) through a cam 125 and side faces 43d of the teeth of the dog clutch 43a. On the other hand, the rotation of the outer differential casing 31 during the vehicle's backward traveling is transmitted to the inner differential casing 41 through a cam 127 and the opposite side faces 43e of the teeth of the dog clutch 43a.

When the power transmitting system is inactivated by operation of the above-mentioned actuator means to switch into 2-wheel drive, the torque in the direction of arrow F is exerted from the wheels' side to the outer differential casing 31 due to the wheels' trailing rotation. Accordingly, in such a case, a direction of the torque coincides with a direction of the torque during the vehicle's backward traveling, so that the cam 127 and the side faces 43e of the dog clutch 43a are brought into contact.

Providing that cam angles of the dog clutch 43a and the cam 125 in the vehicle's forward traveling are represented by αd, βd, respectively, while cam angles of the dog clutch 43a and the cam 127 in the vehicle's backward traveling are represented by αc, βc, respectively, the relationship in accordance with the embodiment are established as follows:

$$\alpha d < \beta d, \quad \alpha c \geq \beta c \qquad (1)$$

Furthermore;

$$\beta d - \alpha d > \beta c - \alpha c \qquad (2)$$

Consequently, when the vehicle is traveling forward, the clutch member 43 is urged so that the dog clutch 43a engages with the opposing dog clutch 41b (FIG. 3) since the cam angle βd of the cam 125 is larger than the cam angle αd of the dog clutch 43a as indicated with the inequality (1). That is, owing to a so-called "self-locking" function of this arrangement, the dog clutch 43a can be maintained under the engaged condition with the dog clutch 41a.

On the other hand, when the vehicle is traveling backward, the clutch member 43 is urged so that the dog clutch 43a disengages from the opposing dog clutch 41b since the cam angle βc of the cam 127 is equal to or less than the cam angle αc of the dog clutch 43a.

Note, as mentioned above, since the torque direction after switching 2-wheel drive coincides with the torque direction under the vehicle's backward traveling condition, the clutch member 43 is urged so that the dog clutch 43a disengages from the opposing dog clutch 41b.

In addition, when the vehicle is traveling, the force of inertia in the rotating direction is applied on the clutch member 43. Therefore, the cam 125 (cam angle: βd) simultaneously cooperates with the dog clutch 43a (the side of the cam angle αd) on one side of the rotating direction, while the cam 127 (cam angle:, βc) simultaneously cooperates with the dog clutch 43a (the side of the cam angle αc) on the other side of the rotating direction. Then, according to the embodiment, since the cam angle βd is set to be larger than the cam angle αd, the difference (βd–αd) corresponds to the thrust force in the engaging direction of the dog clutches 43a, 41a. Since the cam angle βc is set to be smaller than the cam angle αc, the difference (βc–αc) corresponds to the thrust force in the disengaging direction of the dog clutches 43a, 41a.

Further, since the thrust force (βd–αc) in the direction of engagement is larger than the thrust force (βc–αc) in the direction of disengagement, the former thrust force is exerted on the clutch member 43 during the vehicle's traveling, so that disengagement of dog clutch 43a can be prevented to maintain the 4-wheel drive condition. Further, since the thrust force is decreased in switching to two-wheel drive, the switching can be assured.

As mentioned above, by altering the cam angles of the dog clutch 43a and the cams 125, 127 between forward traveling and backward traveling in the embodiment, the engagement of the dog clutches 43a, 41a can be maintained by the self-locking function under 4-wheel drive condition, while disengagement of the dog clutches 43a, 41a can be facilitated at the time of switching to 2-wheel drive.

According to the embodiment, owing to the ease of switching to two-wheel drive, there is no need to enlarge return spring 63 and the actuator body 65. This is different from the conventional differential apparatus. The frictional wear between the pusher 165c and the retainer 61 are reduced when return spring 63 and the actuator body 65 are made smaller.

Further, owing to the ease of disengagement of the dog clutches 43a, 41a during backward traveling, switching for the two-wheel drive can be facilitated.

Additionally, since the cams 125, 127 are constituted by the clutch member 43 and the outer differential casing 31 while making use of the openings 31e (FIG. 3), it is possible to reduce the manufacturing cost.

According to the embodiment, return spring 63 is disposed between the flange 61a of the retainer 61 and the outer differential casing 31, while the retainer 61 is fixed on the clutch member 43. Consequently, the return spring 63 can be arranged at the exterior of the casing 31. Owing to such an arrangement of the return spring 63, it is possible to simplify the interior structure of the outer differential casing 31. The outer differential casing 31 can thus be made smaller to facilitate the assembling of the differential apparatus 13.

Correspondingly, the exchanging operation of the return spring 63 can be facilitated and it is possible to solve a problem of wearing in the return spring 63 since there is no relative rotation between the return spring 63 and the outer differential casing 31.

The Fourth Embodiment

The fourth embodiment of the invention will be described with reference to FIG. 10. Note, also in this embodiment, elements similar to those in the third embodiment are indicated with the same reference numerals, respectively.

Figure 10:
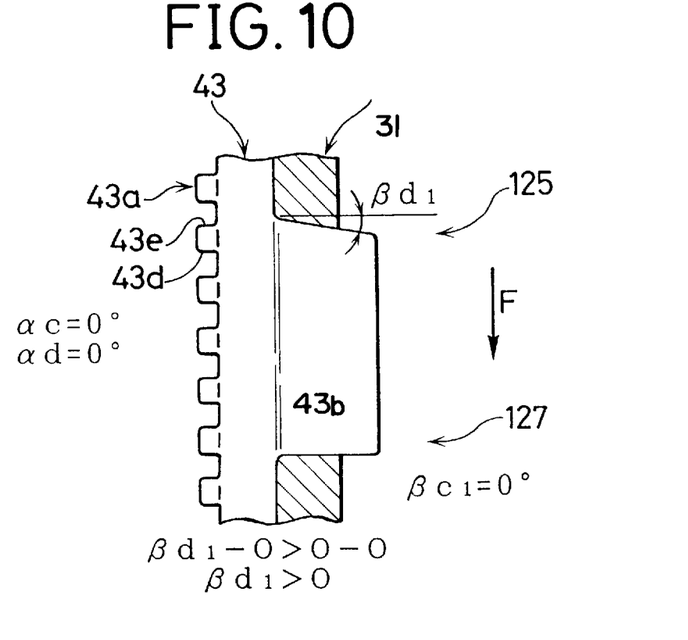
FIG. 10 is a partial schematic view of a dog clutch of a differential apparatus in accordance with a fourth embodiment of the present invention, similarly to FIG. 4A viewed in the direction of arrow A of FIG. 3.

As indicated in FIG. 10, according to the embodiment, the cam angles αd, αc of the dog clutch 43a are both set to be 0°. In addition, the cam angle βd1 of the cam 125 in the direction of the vehicle's forward traveling is established to a predetermined angle, while the cam angle βc1 of the cam 127 in the direction of the vehicle's backward traveling is established to 0°.

In this way, under condition that the vehicle is traveling forward, the cam angle βd1 is larger than the cam angle αd (0°). Therefore, due to the difference between the cam angle βd1 and the cam angle αd, the clutch member 43 is urged to engage the dog clutches 43a with the opposing dog clutch 41a (FIG. 3), so that they are maintained under the engaged condition by this self-locking function.

On the contrary, under condition that the vehicle is traveling backward, the cam angle αc is 0° and the thrust force in the direction of engagement of the dog clutches 43a, 41a is not produced, so that the dog clutches 43a, 41a can be disengaged from each other easily and switching to 2-wheel drive can be made smoothly.

In addition, since the cam angles αd, αc of the dog clutch 43a are set to be 0° together, no thrust force produced to disengage the dog clutches 43a, 41a from each other, even if the inertia in the rotating direction is applied on the clutch member 43. Consequently, the meshing state in the dog clutches 43a, 41a can be maintained stably.

Furthermore, since dog clutch 43a is shaped with cam angle αd of 0°, the cam angle βd1 of cam 125 opposite to the cam angle αd can be decreased as much. Similarly, since the dog clutch 43a is also shaped with the cam angle βc of 0°, the cam angle βc1 of the cam 127 opposite to the cam angle αc can be established to be 0°.

In this way, with the decreased thrust forces of the cams 125, 127, it is possible to decrease the spring constant of the return spring 63 such that actuator body 65 can be made smaller.

In this embodiment, by differentiating the respective cam angles of the dog clutch 43a and cams 125, 127 at the vehicle's forward traveling from those at the vehicle's backward traveling, the engagement condition between the dog clutches 43a and 41a can be maintained at the vehicle's forward traveling. Further, in case of switching for 2-wheel drive condition, it is possible to release the engagement condition of dog clutches 43a, 41a easily, so that switching to 2-wheel drive condition can be completed certainly.

Also in this embodiment, with the above-mentioned facility of switching for 2-wheel drive condition, it is not necessary to enlarge return spring 63 and the actuator body 65, so that the frictional wear between pusher 165c and retainer 61 can be further reduced because the return spring 63 and the actuator body 65 can be made smaller.

The Fifth Embodiment

Figure 11:
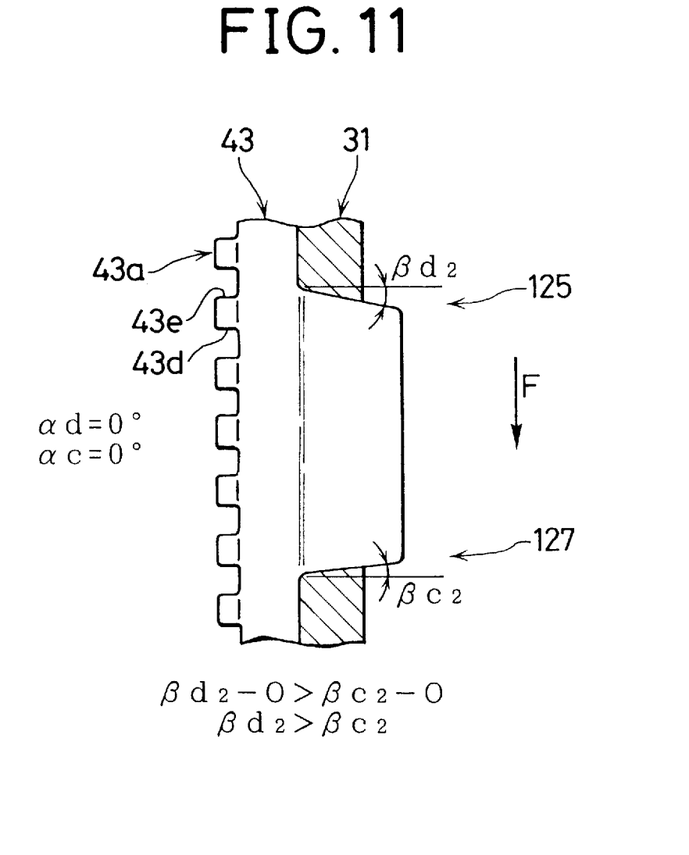
FIG. 11 is a partial schematic view of a dog clutch of a differential apparatus in accordance with a fifth embodiment of the present invention, similarly to FIG. 4A viewed in the direction of arrow A of FIG. 3.

The fifth embodiment of the invention will be described with reference to FIG. 11. Note, also in this embodiment, elements similar to those in the third embodiment are indicated with the same reference numerals, respectively.

As indicated in FIG. 10, according to the embodiment, the cam angles $\alpha d$, $\alpha c$ of the dog clutch 43a are set to be 0° in both cases of the vehicle's forward and backward traveling. In addition, the cam angle $\beta d2$ of the cam 125 at the vehicle's forward traveling is established to be larger than the cam angle $\beta c2$ of the cam 127 at the vehicle's backward traveling (i.e. $\beta d2 > \beta c2$).

In this way, since the cam angle $\beta d2$ of the cam 125 is larger than the cam angle $\alpha d$ (0°) of the dog clutch 43a, the clutch member 43 is urged to engage the dog clutches 43a with the opposing dog clutch 41a (FIG. 3) at the vehicle's forward traveling, due to the difference between the cam angle $\beta d2$ and the cam angle $\alpha d$. Consequently, the dog clutches 43a, 41a can be maintained under the engaged condition by this self-locking function.

When the vehicle is traveling backward, the cam angle $\alpha c$ of the dog clutch 43a is set to 0° and the thrust force to engage the dog clutches 43a, 41a with each other is not produced. In addition, since the cam angle $\beta c2$ of the cam 127 is established smaller than the cam angle $\beta d2$ of the cam 125, the thrust force for engaging the dog clutches 43a, 41a with each other is reduced as much. Therefore, it is possible to progress the facility to disengage the dog clutches 43a, 41a from each other, so that the switching for the 2-wheels driving can be carried out smoothly.

In addition, as the cam angles $\alpha d$, $\alpha c$ of the dog clutch 43a are set to be 0° together, any thrust force to disengage the dog clutches 43a, 41a from each other is not produced even if the inertia in the rotating direction is applied on the clutch member 43. Consequently, the meshing state in the dog clutches 43a, 41a can be maintained stably.

Furthermore, since the dog clutch 43a is shaped with the cam angle $\alpha d$ of 0°, the cam angle $\beta d2$ of the cam 125 opposite to the cam angle $\alpha d$ can be decreased as much. Similarly, since the dog clutch 43a is also shaped with the cam angle $\alpha c$ of 0°, the cam angle $\beta c2$ of the cam 127 opposite to the cam angle $\alpha c$ can be decreased as much.

In this way, owing to the decreased thrust forces of the cams 125, 127, it is possible to decrease the spring constant of the return spring 63 such that actuator body 65 can be advantageously made smaller.

According to the fifth embodiment, in operation, the engagement condition between the dog clutches 43a and 41a can be maintained at the vehicle's forward traveling. Further, when switching for 2-wheel drive, it is possible to release the engagement condition of the dog clutches 43a, 41a easily, so that the switching for 2-wheel drive condition can be completed certainly.

Also in this embodiment, with the above-mentioned facility of switching for 2-wheel drive condition, it is not necessary to enlarge return spring 63 and the actuator body 65, so that the frictional wear between the pusher 165c and the retainer 61 can be reduced even more. This is because the return spring 63 and the actuator body 65 can be made smaller.

Finally, it should be understood that the differential apparatus of the invention is applicable to either one of the front differential apparatus which distributes the engine power into the left and right front wheels and the rear differential apparatus which distributes the engine power into the left and right rear wheels.

What is claimed is:

1. A differential apparatus for a part-time four-wheel drive vehicle, which is rotatably accommodated in a differential carrier arranged on the side of axles from which a driving force of an engine is cut off when switching from the four-wheel drive into two-wheel drive and which is capable of distributing the driving force into left and right axles of the vehicle under four-wheel drive condition, said differential apparatus comprising:

an outer differential casing rotatably supported and adapted to be driven by an external force;

an inner differential casing accommodated in said outer differential casing to coaxially rotate therein, said inner differential casing being shaped to be a substantial cylinder;

a clutch member accommodated in said outer differential casing to be adjacent to said inner differential casing and moved in the axial direction with respect to said outer differential casing, said clutch member being shaped to be a substantial cylinder and associated with said outer differential casing so as to rotate integrally therewith;

a pair of dog clutches accommodated in said outer differential casing to be engageable with and disengageable from each other, one of said dog clutches being arranged on an axial end face of said inner differential casing which faces said clutch member, and the other of said dog clutches being arranged on an axial end face of said clutch member, which faces said inner differential casing;

a differential gear system arranged in said inner differential casing, said differential gear system being in the form of bevel gears; and an actuator for actuating said clutch member so that said dog clutches are engaged with or disengaged from each other in association with the vehicle's switching between four-wheel drive and two-wheel drive, said actuator arranged to be adjacent to said clutch member;

wherein said differential gear system comprises a pinion shaft secured on said inner differential casing perpendicularly to an axis thereof, a plurality of pinion gears carried by said pinion shaft to rotate thereon and a pair of side gears disposed coaxially and engaged with said pinion gears respectively, said side gears having respective boss portions born by said outer differential casing; and said outer differential casing having an inner wall portion for receiving a thrust force of said inner differential casing which originates in the engagement of said dog clutches and another inner wall portion for receiving a thrust force of said side gears.

2. A differential apparatus as claimed in claim 1, wherein said dog clutches, said actuator and said wall portion for receiving the thrust force of said inner differential casing are substantially arranged on the same diameter.

3. A differential apparatus as claimed in claim 1, wherein said outer differential casing is provided, in an outer wall portion thereof, with a plurality of holes arranged in the circumferential direction, while said clutch member is provided with a plurality of legs engaged into said holes, respectively, whereby said clutch member can be associated with said outer differential casing to rotate integrally therewith; and     each of said holes defined by opposing side faces which are convergent-tapered toward the outside in the axial direction of said differential apparatus, while each of said legs is also defined by opposing side faces which are convergent-tapered toward the outside in the axial direction of said differential apparatus, whereby cams can be provided by said opposing side faces of said holes and said legs and whereby said dog clutches can be urged to engage each other when said outer differential casing rotates.

4. A differential apparatus as claimed in claim 3, wherein said actuator comprises a return spring for urging said clutch member to a direction to disengage said dog clutches from each other and an actuator body for operatively moving said clutch member in the opposite direction to engage said dog clutches with each other, and opposed to a force of said return spring.

5. A differential apparatus as claimed in claim 4, wherein said dog clutches include meshing teeth each profiled with two cam angles $\alpha$ by which said clutch member is urged to the direction to disengage said dog clutches from each other, one of said cam angles $\alpha$ being in effect when the vehicle is traveling forward and the other of said cam angles $\alpha$ being in effect when the vehicle is traveling backward;

said cams are each profiled with two cam angles $\beta$ by which said clutch member is urged in the direction to engage said dog clutches with each other one of said cam angles $\beta$ being in effect when the vehicle is traveling forward and the other of said cam angles $\beta$ being in effect when the vehicle is traveling backward; and     said cam angles $\alpha$ of said dog clutches and said cam angles $\beta$ of said cams in the vehicle's forward traveling are represented by $\alpha d, \beta d$, respectively, while said cam angles $\alpha$ of said dog clutches and said cam angles $\beta$ of said cams during backward travel are represented by $\alpha c$, $\beta c$, respectively, a relationship among said cam angles is as follows:

$$\beta d - \alpha d > \beta c - \alpha c$$

6. A differential apparatus as claimed in claim 5, wherein said cam angles are further characterized by equations as follows:

$$\alpha c = 0°$$

$$\alpha d = 0°$$

$$\beta c = 0°$$

7. A differential apparatus as claimed in claim 5, wherein said cam angles are further characterized by equations as follows:

$$\alpha c = 0°$$

$$\alpha d = 0°$$

$$\beta d > \beta c$$

8. A differential apparatus as claimed in claim 4, wherein said actuator body is annular shaped and is arranged about a boss portion of said outer differential casing and adjacent to said outer wall portion of said outer differential casing, coaxially with said boss portion.

9. A differential apparatus as claimed in claim 8, wherein said actuator body includes a diaphragm displaced by air pressure and a stopper for limiting displacement of said diaphragm.

10. A differential apparatus as claimed in claim 8, further comprising a retainer for retaining said clutch member, said retainer being in the form of a thin cylindrical member and consisting of a flange which is formed at one axial end of said cylindrical member to extend perpendicularly to the axis of said cylindrical member for bearing one end coil of said return spring on one side of said clutch member and a flared portion which is formed at the other axial end of said cylindrical member to project radially outward and engage in a peripheral groove formed on the inner periphery of said clutch member.

* * * * *